United States Patent
Ashikawa

(10) Patent No.: US 9,176,663 B2
(45) Date of Patent: Nov. 3, 2015

(54) ELECTRONIC DEVICE, GESTURE PROCESSING METHOD AND GESTURE PROCESSING PROGRAM

(75) Inventor: Shigeru Ashikawa, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 228 days.

(21) Appl. No.: 13/377,020

(22) PCT Filed: Jun. 3, 2010

(86) PCT No.: PCT/JP2010/059802
§ 371 (c)(1),
(2), (4) Date: Dec. 8, 2011

(87) PCT Pub. No.: WO2010/143673
PCT Pub. Date: Dec. 16, 2010

(65) Prior Publication Data
US 2012/0086662 A1   Apr. 12, 2012

(30) Foreign Application Priority Data
Jun. 10, 2009   (JP) .................................. 2009-138828

(51) Int. Cl.
*G06F 3/0488* (2013.01)
(52) U.S. Cl.
CPC .................................. *G06F 3/04883* (2013.01)
(58) Field of Classification Search
CPC ....................................................... G06F 3/017
USPC .................... 345/173–182; 715/700
See application file for complete search history.

(56) References Cited

U.S. PATENT DOCUMENTS

2007/0236475 A1* 10/2007  Wherry .......................... 345/173

FOREIGN PATENT DOCUMENTS

| JP | 05-127819 | 5/1993 |
|----|-----------|--------|
| JP | 2006-099468 | 4/2006 |
| JP | 2006-331210 | 12/2006 |
| JP | 2007-213245 | 8/2007 |
| JP | 2008-282092 | 11/2008 |
| JP | 2008282092 A * | 11/2008 |

OTHER PUBLICATIONS

Office Action issued Jun. 11, 2013 by the Japanese Patent Office in counterpart Japanese Patent Application No. 2011-518567 with partial English translation.
International Search Report, PCT/JP2010/059802, Aug. 10, 2010.

* cited by examiner

*Primary Examiner* — Kenneth B Lee, Jr.

(57) ABSTRACT

An electric device supports gesture input, so a user can determining whether the electric device is in a state of accepting the gesture input. An electronic device includes a touch panel display, a storage unit for storing sets of display data and trajectory related information that is associated with each set of display data, and a control unit. The trajectory related information includes trajectory data and function information that is associated with the trajectory data, and the control unit determines whether or not to accept the gesture input on the basis of the trajectory related information that is associated with the display data displayed on the touch panel display. When having determined to accept the gesture input, overlay-displays on the touch panel display, the trajectory data included in the trajectory related information that is associated with the display data so as to be overlaid on the display data.

21 Claims, 12 Drawing Sheets

ELECTRONIC DEVICE, GESTURE PROCESSING METHOD AND GESTURE PROCESSING PROGRAM

TECHNICAL FIELD

The invention relates to an electronic device, a gesture processing method and a gesture processing program, which are capable of carrying out gesture input by using a touch panel display.

BACKGROUND ART

A mobile terminal device, like a mobile phone and a PDA (Personal Data Assistance, Personal Digital Assistants) is becoming popular. In these days, a display unit of the mobile terminal device is getting larger and contents to be displayed on the display unit are upgraded. It becomes required than ever before to make operations easy to understand for a user by making the mobile terminal device multifunctional and upgraded so that a user fully utilizes the mobile terminal device.

Therefore, a touch panel display is employed in order to achieve understandability of operations while utilizing high-quality display. The touch panel display includes a function of a touch panel that an object touched by a user is inputted as input data and a function of the display unit which displays a result of an operation. With respect to display data displayed on the touch panel display, when a user points (touch) the touch panel display by using a finger, a pen, or the like, processes of cursor movement through a key operation and selection decision by using an ENTER key can be shortened. Thereby, operations in which input frequency is decreased are achieved.

Further, a technique of gesture input is attained as a technology using the touch panel display. The gesture input means that a user touches the touch panel display to input a predetermined trajectory (input trajectory). When a predetermined trajectory 213-1 is registered in a storage unit of a mobile terminal device as shown in FIG. 14A, and when an input trajectory 220 corresponds to the trajectory 213-1 as shown in FIG. 14B, the mobile terminal device activates and executes a function corresponding to the trajectory 213-1.

However, a current way of the gesture input includes following problems.

Initially, a first problem is described. In the gesture input, a user has to draw the same trajectory as predetermined trajectory data as the input trajectory. When a plurality of types of trajectory data exist, a user has to remember the plurality of trajectory data. In this case, it is expected that a user fails to utilize the gesture input due to faulty memory or input of an ambiguous trajectory. In this case, since an input trajectory 221 do not correspond to the trajectory 213-1 as shown in FIG. 14B, the mobile terminal device neither activates nor executes a function desired by a user.

Next, a second problem is described. The mobile terminal device executes processing based on a user's touching operation of the touch panel display or a user's operation of an input unit, and displays display data generated based on the processing on the touch panel display. At this time, when displaying the display data on the touch panel display, the mobile terminal device does not always accept the gesture input. That is because both software responding to the gesture input and software not responding thereto exist. Suppose that while the software not responding to the gesture input works, the display data used in the software is displayed on the touch panel display and a user draws a predetermined trajectory while touching the touch panel display. Then, the software does not execute processing. The user, however, cannot determine whether the reason why the software fails to execute processing is because the mobile terminal device is not in a state of accepting the gesture input since the working software does not meet the gesture input, because the drawn trajectory is wrong, or because the gesture input is carried out by mistake. Therefore, it is desired that a user is capable of recognizing whether or not the gesture input is accepted.

Patent document 1 describes a mobile terminal. The mobile terminal includes a camera input interface which executes a performance associated with a movement trajectory of a determination object inputted from a camera. The mobile terminal is characterized in further including means for outputting operation guidance information representing a correspondence relation between the movement trajectory of the determination object and the performance associated with the movement trajectory, and means for drawing the movement trajectory of the determination object, input of which is accepted, so as to be overlaid on display contents of a display.

Patent document 2 describes a user interface device. The user interface device includes storage means, trajectory analysis means, gesture search means, guide trajectory display means, and command calling means. The storage means stores a gesture to which a predetermined command is allocated and a guide trajectory leading the gesture. The trajectory analysis means analyzes a user's operation trajectory on a trajectory input device. The gesture search means searches one or more than one gesture corresponding to the operation trajectory in a gesture stored in the storage means, each time the trajectory analysis means analyzes the user's operation trajectory. The guide trajectory display means acquires, from the storage means, the guide trajectory searched by the gesture search means and displays the guide trajectory, and deletes the displayed guide trajectory of the gesture when the gesture previously searched by the gesture search means does not accord with the user's operation trajectory. When the gestures searched by the gesture search means are confined to one, the command calling means calls the command allocated to the gesture.

PRIOR ART REFERENCES

Patent Reference

Patent document 1: Japanese Patent Application Laid Open No. 2007-213245
Patent document 2: Japanese Patent Application Laid Open No. 2006-331210

SUMMARY OF THE INVENTION

Problem to be Solved by the Invention

The technology described in Patent document 1 relates to input of trajectory data. In the technology, however, though the first problem above-mentioned is partially solved since the gesture input is supported for a user by outputting the operation guidance information (trajectory data), an auxiliary display for outputting the operation guidance information is required. Further, the second problem above-mentioned is not considered at all.

The technology described in Patent document 2 is a technology in which a command allocated to the trajectory data is used if the trajectory data is not correctly remembered. In this technology, though the first problem above-mentioned is partially solved since gesture input is supported for a user by displaying one set or more than two sets of trajectory data (guide trajectory) corresponding to a user's input trajectory (operation trajectory) on the touch panel display, the user is still required to remember a plurality of sets of trajectory data. Further, the second problem above-mentioned is not considered at all.

An object of the invention is to provide an electronic device, a gesture processing method and a gesture processing program, which support the gesture input which is the problem above-mentioned and solve a problem that a user is not capable of determining whether or not the electronic device is in a state of accepting the gesture input. That is, the object of the invention is to provide the electronic device, the gesture processing method and the gesture processing program, which can support the gesture input, and by which a user is capable of determining whether or not the electronic device is in a state of accepting the gesture input.

Means for Solving Problem

An electronic device of the invention includes a touch panel display, a storage unit for storing a plurality of sets of display data and trajectory related information that is associated with each of the sets of display data, and a control unit. The trajectory related information includes trajectory information and function information that is associated with the trajectory data. The control unit determines whether or not to accept gesture input on the basis of the trajectory related information that is associated with the display data to be displayed on the touch panel display, and when determining to accept the gesture input, overlay-displays on the touch panel display, the trajectory data included in the trajectory related information that is associated with the display data so as to be overlaid on the display data.

In a gesture processing method of the invention, it is determined whether or not to accept the gesture input on the basis of the trajectory related information that is associated with the display data to be displayed on the touch panel display. When it is determined to accept the gesture input, the trajectory data included in the trajectory related information that is associated with the display data is overlay-displayed on the touch panel display so as to be overlaid on the display data.

A gesture processing program of the invention causes a computer to execute determining whether or not to accept the gesture input on the basis of the trajectory related information that is associated with the display data to be displayed on the touch panel display, and execute overlay-displaying on the touch panel display, trajectory data included in the trajectory related information that is associated with the display data so as to be overlaid on the display data, when it is determined to accept the gesture input.

Effect of the Invention

In the electronic device of the invention, it is possible to support the gesture input, and a user is capable of determining whether or not the electronic device is in a state of accepting the gesture input.

MODE FOR CARRYING OUT THE INVENTION

The invention is described below in detail in reference to drawings.

[First Embodiment]

Figure 1:
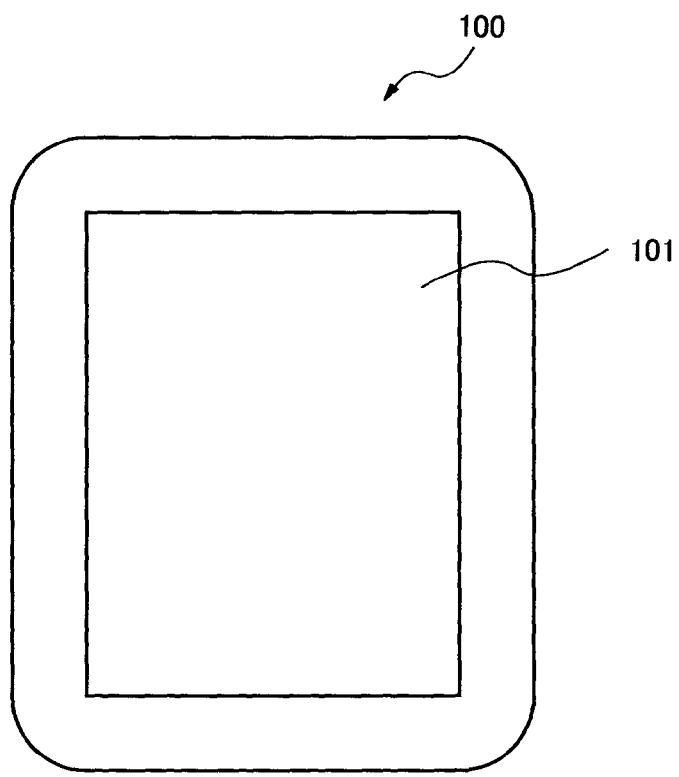
FIG. 1 is a diagram illustrating an outer configuration of an electronic device of a first embodiment of the invention.

FIG. 1 is a diagram illustrating an outer configuration of an electronic device 100 of a first embodiment of the invention. The electronic device 100 includes a touch panel display 101 enabling gesture input.

Figure 2:
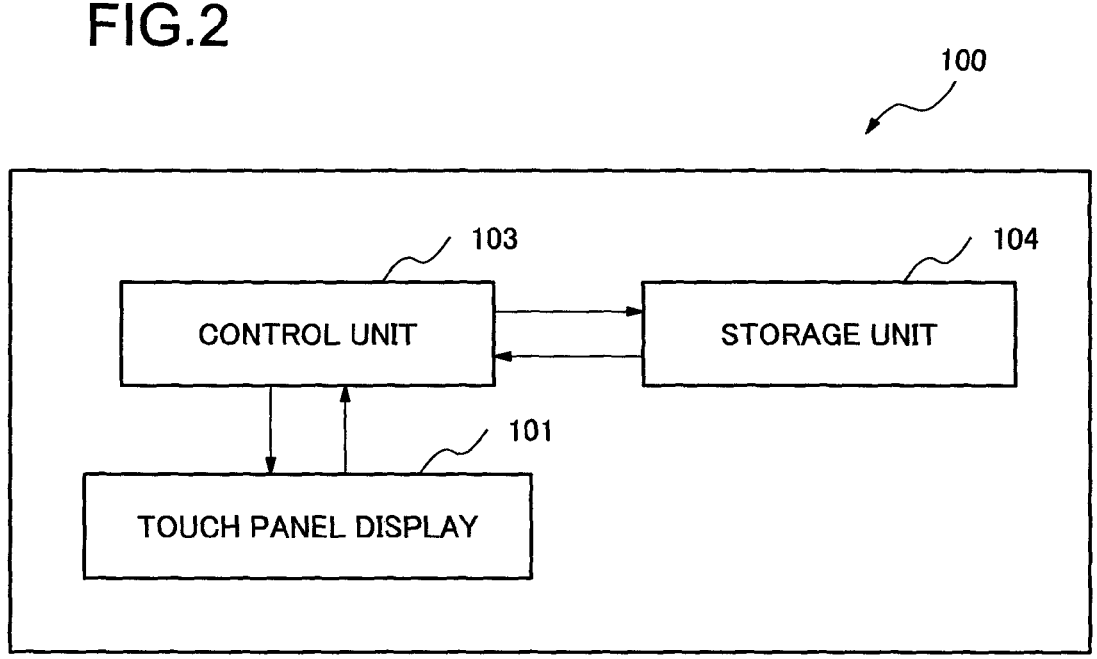
FIG. 2 is a block diagram illustrating a configuration of the electronic device of the first embodiment of the invention.
Figure 3:
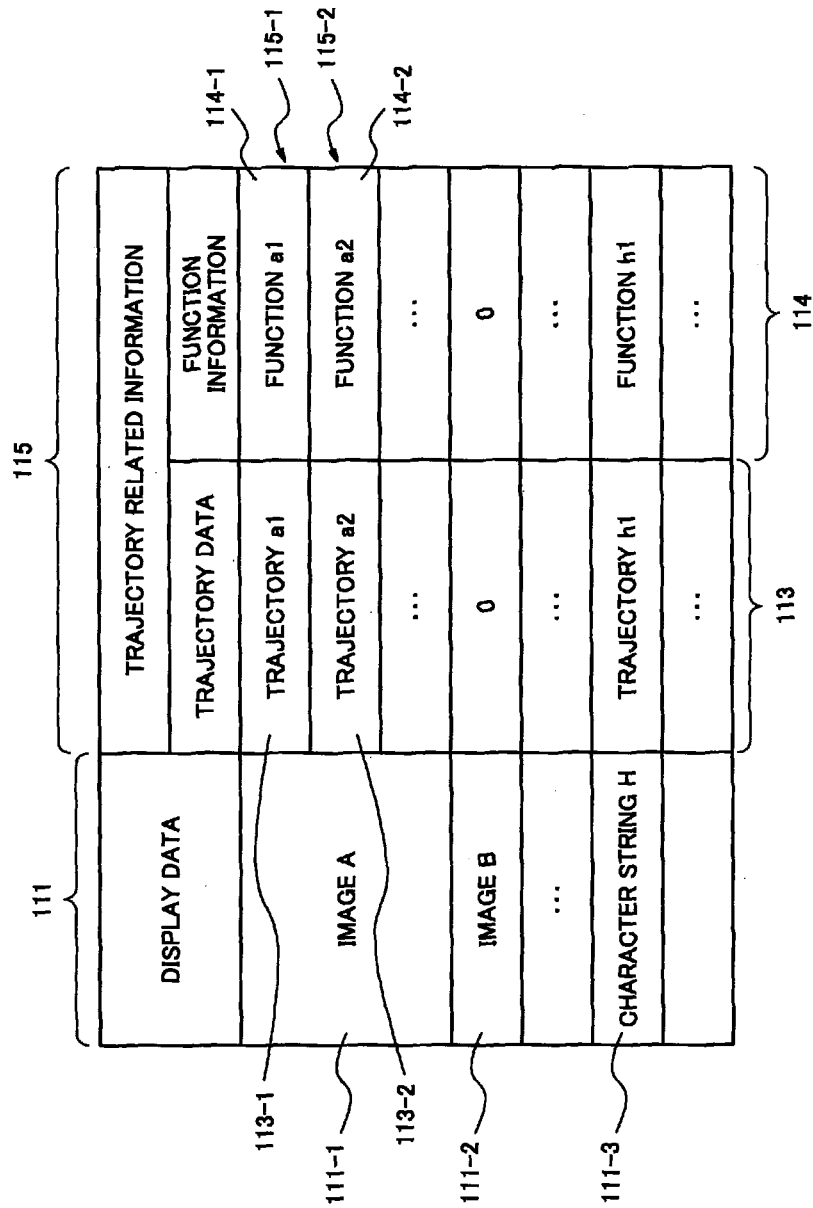
FIG. 3 is a diagram illustrating information stored in a storage unit.

FIG. 2 is a block diagram illustrating a configuration of the electronic device 100. The electronic device 100 includes the touch panel display 101, a storage unit 104 and a control unit 103. The storage unit 104 stores a plurality of sets of display data 111 and trajectory related information 115 associated with each of the sets of display data 111. The display data 111 is image data, like an image A (111-1) and an image B (111-2), or character data, like a character string H (111-3), as shown in FIG. 3. Trajectory related information 115-1, 115-2 include trajectory data 113, like a trajectory a1 (113-1) and a trajectory a2 (113-2), and function information 114 associated with the trajectory data 113, like a function a1 (114-1) and a function a2 (114-2).

The control unit 103 determines whether or not to accept the gesture input on the basis of the trajectory related information 115 associated with the display data 111 to be displayed on the touch panel display 101. When it is determined to accept the gesture input, the trajectory data 113 included in the trajectory related information 115 associated with the display data 111 is overlay-displayed on the display data 111 so as to be overlaid on the display data 111. The display data 111 to be displayed on the touch panel display 101 is data which the control unit 103 optionally selects from the plurality of sets of display data 111 stored in the storage unit 104. The control unit 103, for example, selects the display data 111 to be displayed on the touch panel display on the basis of user's input.

In the electronic device 100 of the embodiment, the control unit 103 determines whether or not to accept the gesture input on the basis of the trajectory related information 115 associated with the display data 111. When it is determined to accept the gesture input, the trajectory data 113 is overlay-displayed on the touch panel display so as to be overlaid on the display data 111. Therefore, it is possible to support the gesture input by using the electronic device 100 and a user is capable of correctly gesture-inputting a right trajectory without remembering the trajectory.

In the electronic device 100 of the embodiment, since trajectory data is overlay-displayed on the touch panel display 101 when the gesture input is accepted, a user is capable of determining that the electronic device 100 in a state of overlay-displaying accepts the gesture input. When the trajectory data 113 is not overlay-displayed, a user is capable of determining not to accept the gesture input.

Figure 4:
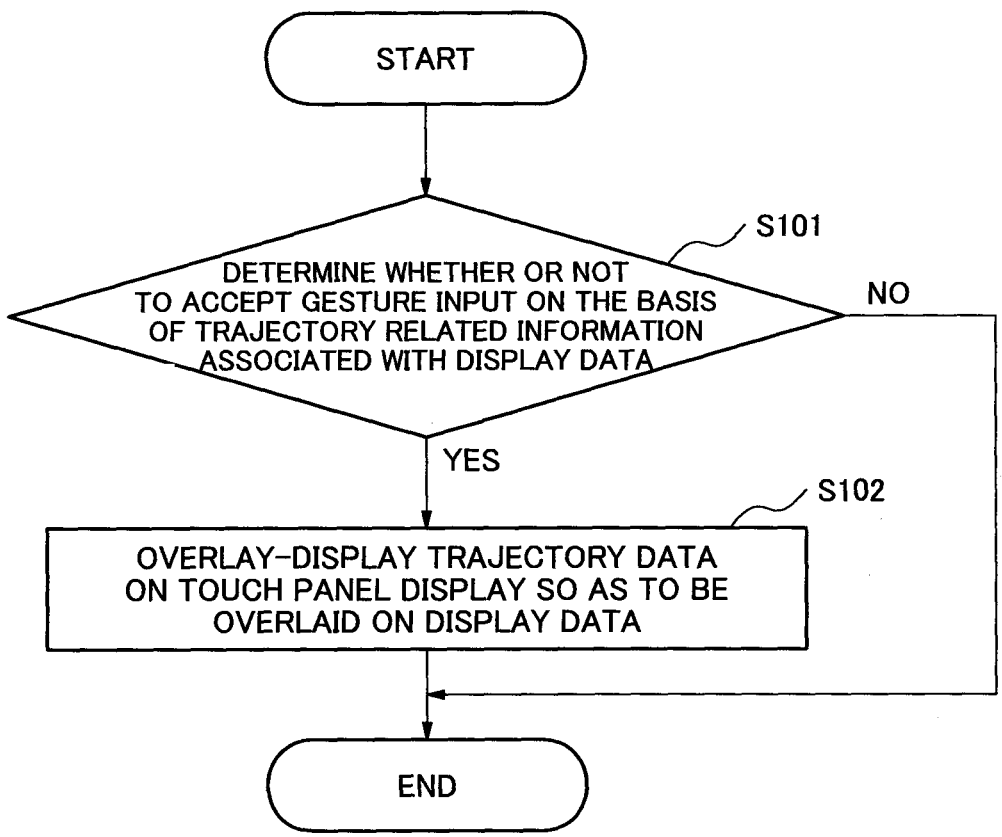
FIG. 4 is a flowchart illustrating a gesture processing method of the first embodiment of the invention.
Figure 5A:
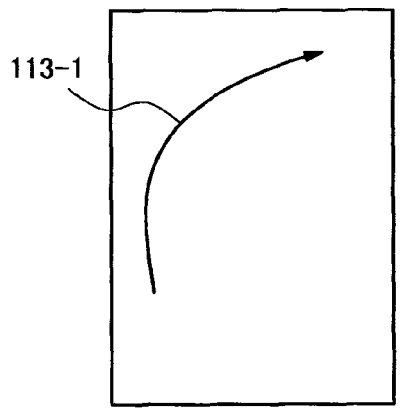
FIG. 5A is a diagram illustrating trajectory data.
Figure 5B:
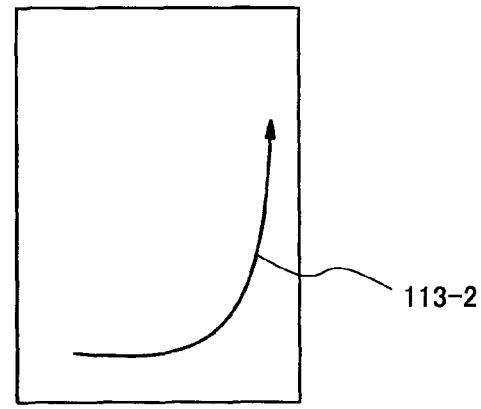
FIG. 5B is a diagram illustrating another trajectory data.
Figure 5C:
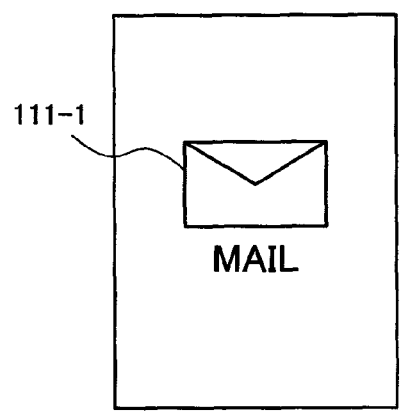
FIG. 5C is a diagram illustrating display data.
Figure 5D:
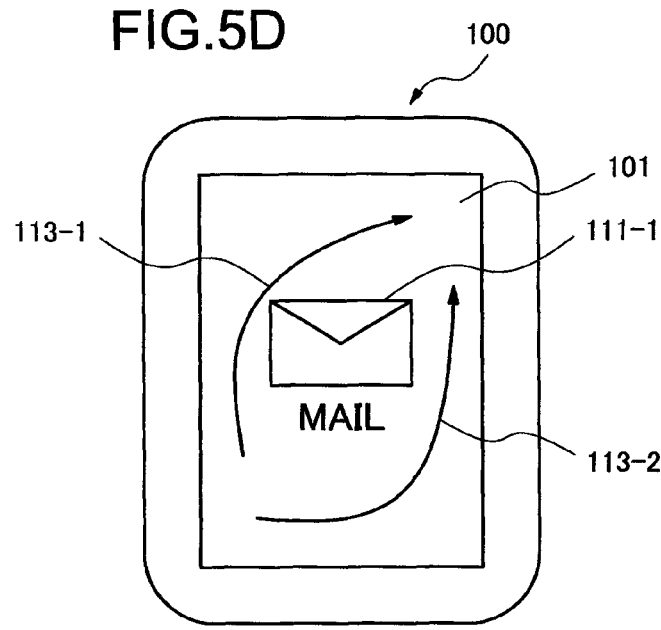
FIG. 5D is a diagram illustrating an example wherein the trajectory data is overlay-displayed on a touch panel display so as to be overlaid on the display data.

Next, a gesture processing method of the embodiment is described by using FIG. 4. Initially, on the basis of trajectory related information associated with display data, it is determined whether or not to accept the gesture input (step S101).

When it is determined that the gesture input is accepted, the trajectory data is overlay-displayed on the touch panel display so as to be overlaid on the display data (step S102).

When it is determined that the gesture input is not accepted, the trajectory data is not overlay-displayed so as to be overlaid on the display data. At this time, the control unit 103, for example, may display only the display data on the touch panel display 101.

It is explained that the trajectory data 113 is overlay-displayed so as to be overlaid on the display data 111, by employing FIG. 5. FIG. 5A and FIG. 5B illustrate the trajectory a1 (113-1) and the trajectory a2 (113-2) as the trajectory data, respectively. FIG. 5C illustrates the image A (111-1) as the display data. The image A (111-1) is image data representing a mail. When the trajectory a1 (113-1) and the trajectory a2 (113-2) are overlay-displayed on the touch panel display 101 so as to be overlaid on the image A (111-1), FIG. 5D is provided. By checking the overlay-displayed display, a user is capable of determining whether or not the electronic device 100 is in a state of accepting the gesture input on the basis of presence or absence of a display of the trajectory data 113, and further is capable of instantly understanding which trajectory is accepted as the gesture input.

The storage unit 104 may includes propriety information representing whether or not to accept the gesture input. If the propriety information is included, the control unit 103 is capable of determining whether or not to accept the gesture input on the basis of the propriety information.

As shown in FIG. 3, when the trajectory related information 115 includes the trajectory data 113 and the function information 114, the control unit 103 determines whether or not to accept the gesture input on the basis of presence or absence of the trajectory data associated with predetermined display data 111 or the function data 114. For example, since the image A (111-1) includes the trajectory a1 (113-1) associated therewith and the function a1 (114-1), and the trajectory a2 (113-2) and the function a2 (114-2), the control unit 103 is capable of determining that the gesture input is accepted, when the image A (111-1) is displayed on the display. On the other hand, the image B (111-2) does not include the trajectory data associated therewith and the function information 114. Therefore, when the image B (111-2) is displayed on the display, the control unit 103 is capable of determining that the gesture input is not accepted. "0" is described in a space for the trajectory data 113 of the image B (111-2) and also described in a space for the function information 114 thereof. This means there is nothing to correspond to the spaces.

A plurality of pieces of the trajectory related information 115 may be associated with one set of display data 111. In this case, it is advisable that the control unit 103 overlay-displays a plurality of sets of the trajectory data 113 included in the plurality of pieces of the trajectory related information 115 on the touch panel display 101 so as to be overlaid on the display data 111. Thereby, a user is capable of instantly recognizing a plurality of types of trajectories.

Figure 6:
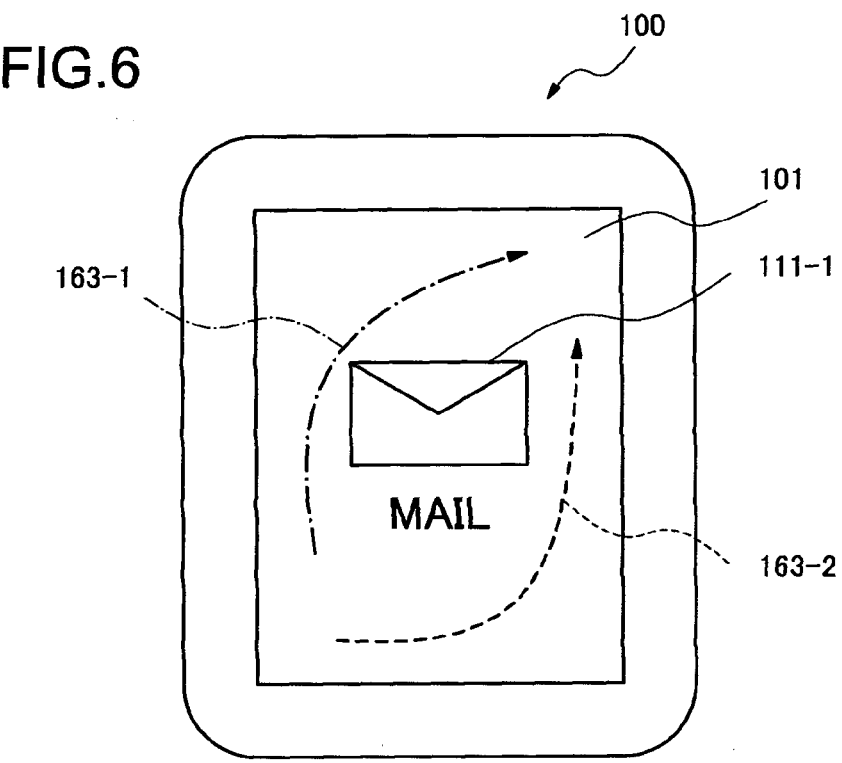
FIG. 6 is a diagram illustrating another example wherein the trajectory data is overlay-displayed on the touch panel display so as to be overlaid on the display data.

When a plurality of sets of trajectory data 113 exist, it is advisable to overlay-display each of sets of the trajectory data 113 in different display forms. For example, as shown in FIG. 6, if each of a trajectory 163-1 and a trajectory 163-2 is allocated to a different line type, a user is capable of correctly recognizing each of the trajectory 163-1 and the trajectory 163-2. Even if each of the trajectory 163-1 and the trajectory 163-2 is allocated to a different color, a user is capable of acquiring the same advantage.

Figure 7:
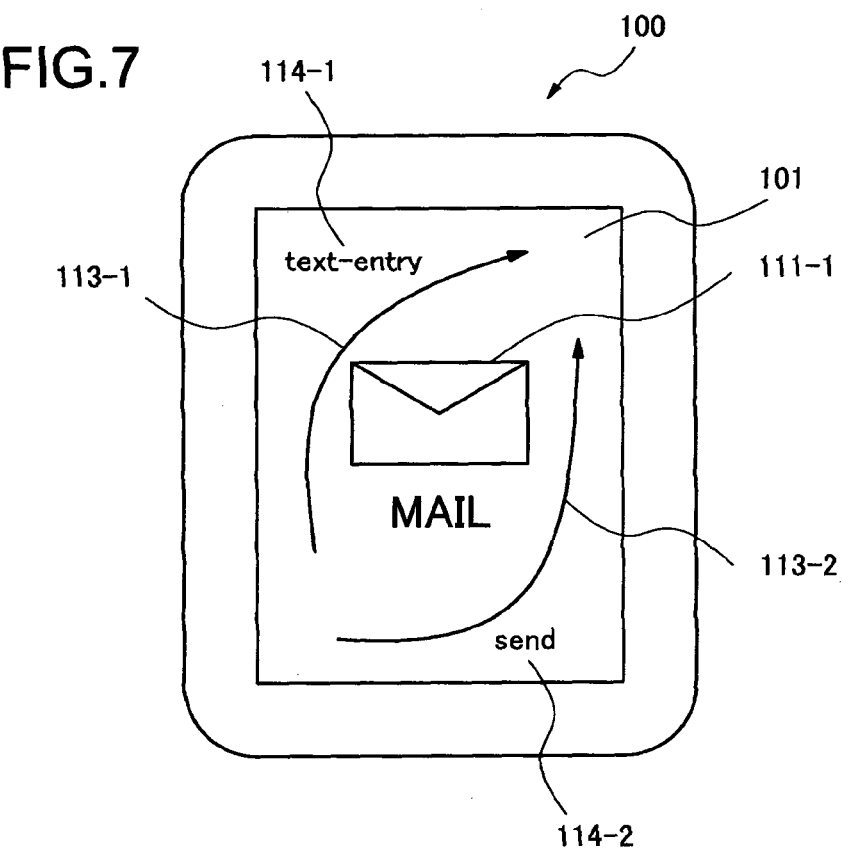
FIG. 7 is a diagram illustrating an example wherein function information is overlay-displayed on the touch panel display so as to be overlaid on the trajectory data and the display data.

The control unit 103 may overlay-display the function information 114 associated with the trajectory data 113 on the touch panel display 101 so as to be overlaid on the trajectory data 113 and the display data 111. For example, as shown in FIG. 7, the function a1 (114-1) is displayed with the trajectory a1 (113-1), and further the function b2 (114-1) is displayed with the trajectory a1 (113-2). Thereby, a user is capable of understanding what function works when each of the trajectory a1 (113-1) and the trajectory a2 (113-2) is gesture-inputted. FIG. 7 illustrates an example wherein a text input function (text-entry) is carried out when the trajectory a1 (113-1) is gesture-inputted, and a mail sending function (send) is carried out when the trajectory a2 (113-2) is gesture-inputted.

[Second Embodiment]

Next, a second embodiment of the invention is described. In the second embodiment, control of the electronic device after the display data and the trajectory data are overlay-displayed on the touch panel display so as to be overlaid, is described. Since it is explained in the first embodiment that the display data and the trajectory data are overlay-displayed so as to be overlaid, the description thereabout is omitted in the embodiment.

When the gesture input is carried out while the trajectory data and display data are overlay-displayed on the touch panel display 101, the control unit 103 of the electronic device 100 in the second embodiment determines the trajectory data 113 which corresponds to an input trajectory inputted through the gesture input in the trajectory data 113, as a selected trajectory data. After that, a function associated with the selected trajectory data is carried out. For example, if the input trajectory corresponds to the trajectory a1 (113-1), the function a1 (114-1) is carried out (FIG. 3). Thereby, a user is capable to causing the electronic device 100 to execute a desired function by using the gesture input.

After determining the selected trajectory data, the control unit 103 may stop displaying the trajectory data 113 on the touch panel display 101. Thereby, a user is capable of recognizing that the selected trajectory is determined.

Determining that the trajectory data corresponding to the input trajectory does not exist in the trajectory data 113 displayed on the touch panel display 101, the control unit 103 may stop displaying the trajectory data 113 on the touch panel display 101. Thereby, a user is capable of recognizing that the selected trajectory is not determined.

When the gesture input is not carried out in a predetermined period of time after the trajectory data 113 is overlay-displayed, the control unit 103 may stop displaying the trajectory data 113 on the touch panel display 101.

[Third Embodiment]

Next, a third embodiment of the invention is described. The electronic device of the third embodiment is a mobile terminal device. A control unit of the mobile terminal device of the third embodiment determines whether or not to accept the gesture input on the basis of the propriety information. The display data is employed, which is the image data converted from the character data.

Figure 8:
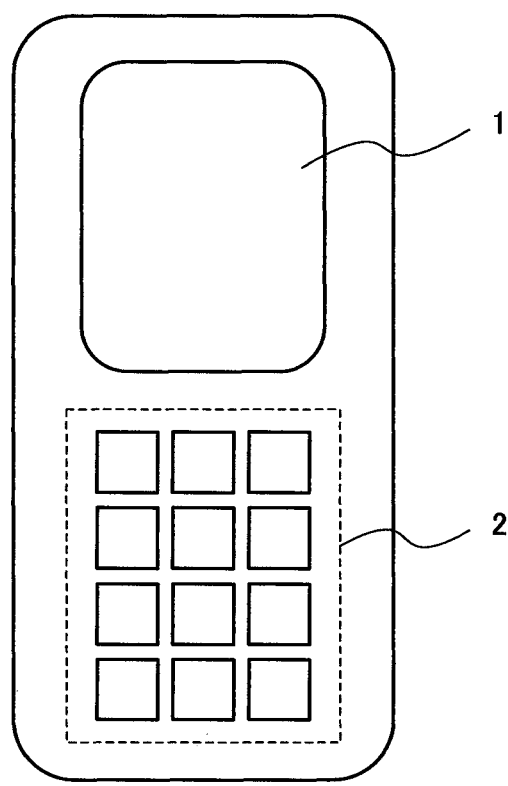
FIG. 8 illustrates an outer configuration of a mobile terminal device of a third embodiment of the invention.

FIG. 8 illustrates an outer configuration of the mobile terminal device of the embodiment.

The mobile terminal device of the embodiment includes a touch panel display 1 and an input unit 2. The touch panel display 1 includes a function of a touch panel for inputting objects touched by a user, as input data, and a function of a display unit for displaying a result of a performance.

Figure 9:
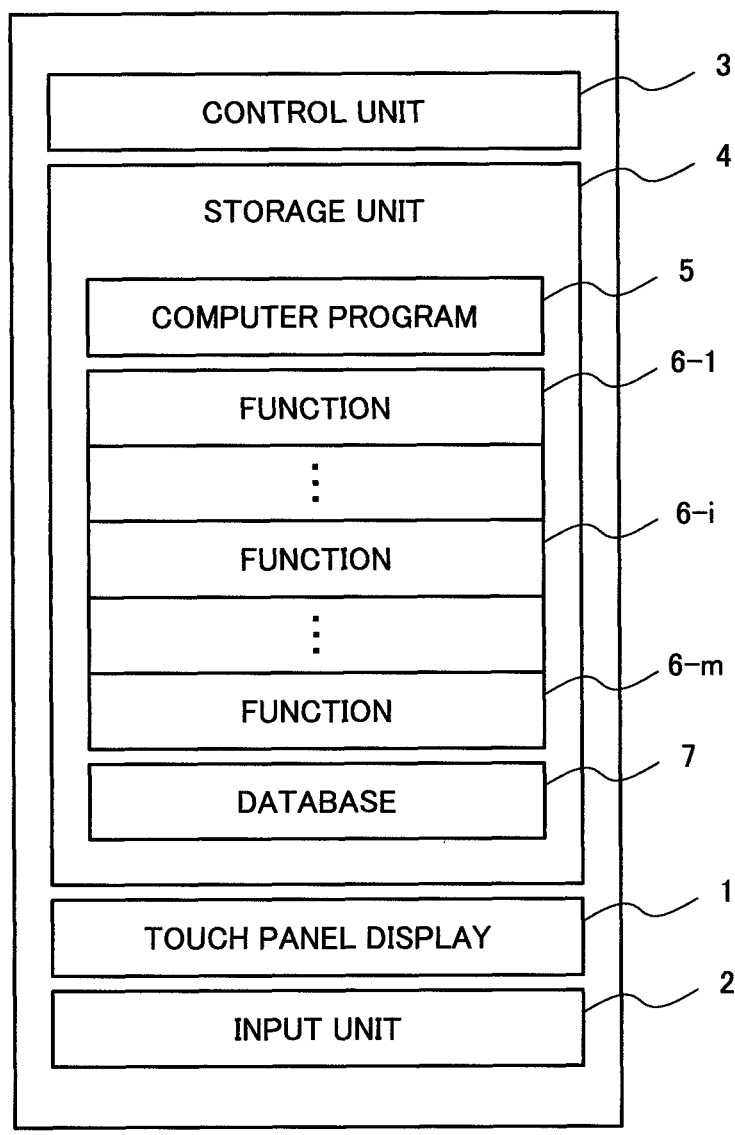
FIG. 9 is a block diagram illustrating a configuration of the mobile terminal device of the third embodiment of the invention.

FIG. 9 is a block diagram illustrating a configuration of the mobile terminal device of the embodiment.

The mobile terminal device of the embodiment further includes a control unit which is a CPU (Central Processing Unit), a storage unit 4 which is a recording medium. The storage unit 4 stores a computer program 5 causing a computer to work. The control unit 3 reads the computer program 5 from the storage unit 4 and works, at the time of startup.

The storage unit 4 includes functions 6-1 to 6-$m$ (m is an integer which is two or more than two). Specifically, the storage unit 3 further stores functions 6-1 to 6-$m$, as software, and the control unit 3 activates function 6-$i$ (i is an integer, where 1≤i≤m), which is one of the functions 6-1 to 6-$m$ in the storage unit 4, and works it, according to an operation described below.

Figure 10:
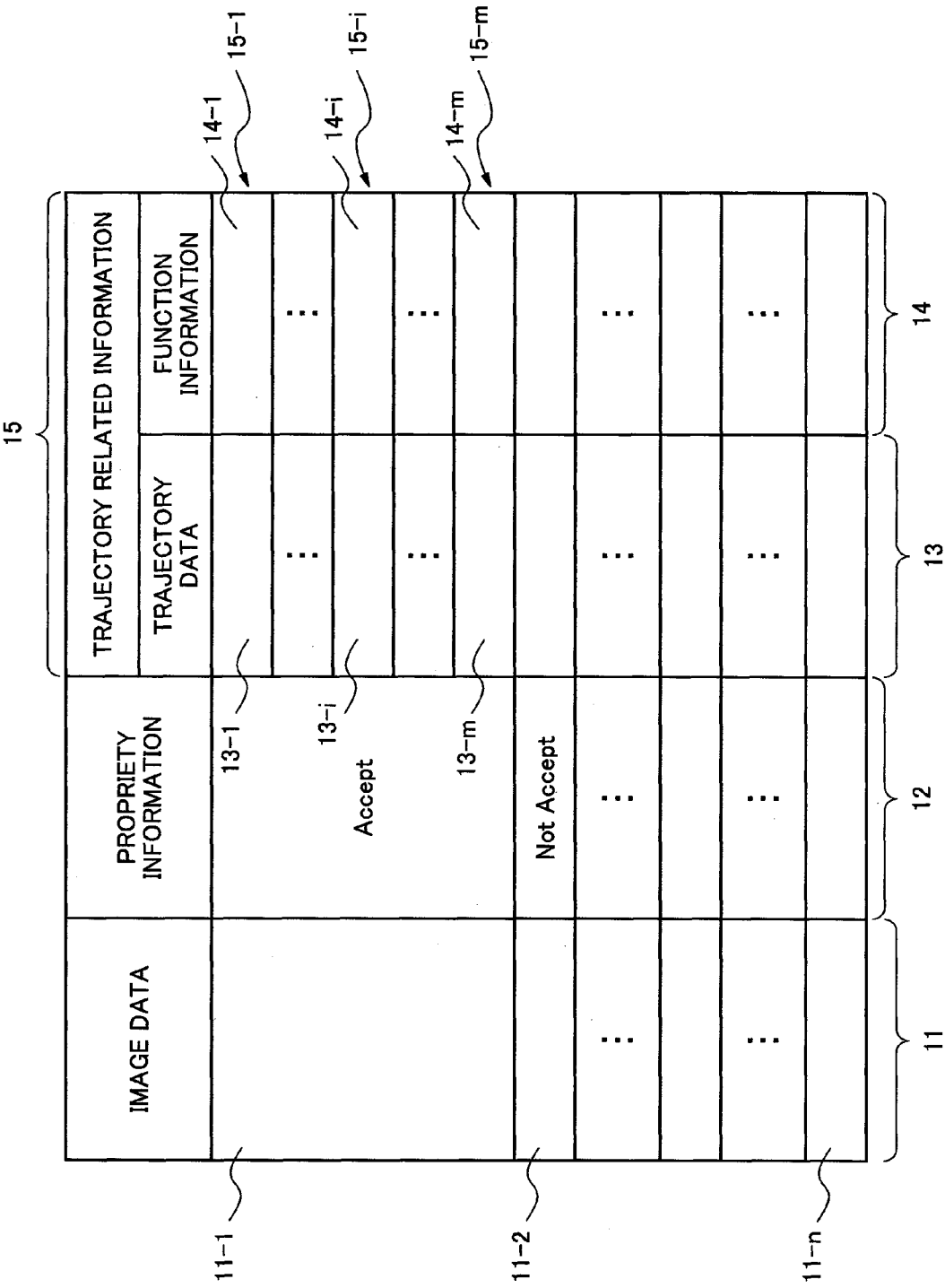
FIG. 10 illustrates contents of a database.

The storage unit 4 includes a database 7. FIG. 10 illustrates contents of the database 7.

The database 7 stores image data 11-1 to 11-$n$ (n is an integer which is two or more than two) of plural patterns. The control unit 3 selects one set of image data in the image data 11-1 to 11-$n$ with the plurality of patterns from the database 7, and displays it on the touch panel display, according to an operation described below.

The propriety information 12 is further registered in the database 7 with respect to each of the image data 11-1 to 11-$n$ with the plurality of patterns. The propriety information 12 represents whether or not software using the image data 11 accepts the gesture input. When the software accepts the gesture input, the mobile terminal device becomes a state of accepting the gesture input when the image data is displayed on the touch panel display 1. When the software does not accepts the gesture input, the mobile terminal device becomes a state of not accepting the gesture input when the image data is displayed on the touch panel display 1.

Trajectory related information 15 associated with the image data 11 is further registered in the database 7. An example is described, that trajectory related information 15-1 to 15-$m$ associated with the image data 11-1 is registered. The trajectory related information 15-1 to 15-$m$ include trajectory data 13-1 to 13-$m$ and function information 14-1 to 14-$m$ which are names of functions 6-1 to 6-$m$ each associated with the trajectory data 13-1 to 13-$m$, respectively.

Figure 11:
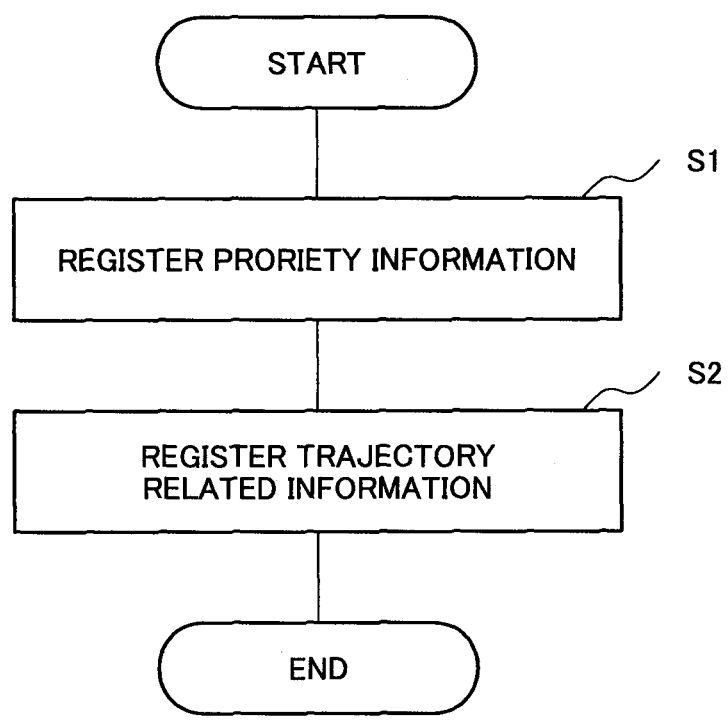
FIG. 11 is a flowchart illustrating processing of an operation in the mobile terminal device of the third embodiment of the invention.

FIG. 11 is a flowchart illustrating processing of registering the propriety information and the trajectory related information in the database 7 as an operation of the mobile terminal device.

Initially, the propriety information 12 above-mentioned is registered in the database 7 with respect to each of the image data 11-1 to 11-$n$ with the plurality of patterns (step S1). A designer, for example, carries out registration of the propriety information 12 in advance.

Next, the trajectory related information 15-1 to 15-$m$ above mentioned are associated with the image data 11-1 and registered in the database 7 (step S2). A designer, for example, carries out registration of the trajectory related information 15-1 to 15-$m$ in advance. When additional registration is further carried out, a user may carry out it.

Figure 12:
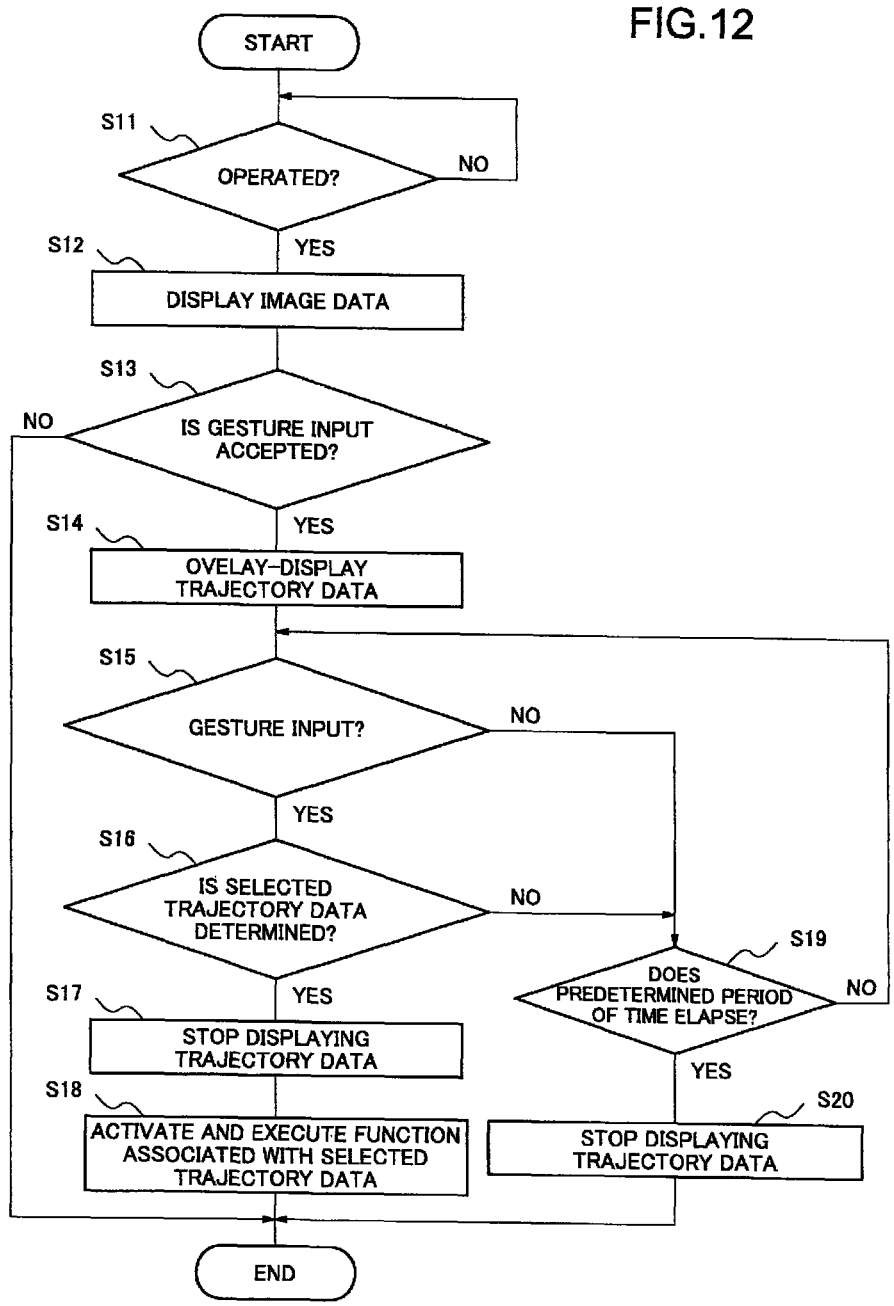
FIG. 12 is a flowchart illustrating processing of an operation in the mobile terminal device of the third embodiment of the invention.

FIG. 12 is a flowchart illustrating a gesture processing method of the embodiment.

A user does not yet conduct a touch operation on the touch panel display 1 or an operation of the input unit 2 (step S11-NO). In this case, the control unit 3 displays current image data on the touch panel display 1. In other words, it is in a stand-by state.

Suppose that a user conducts the touch operation on the touch panel display 1 or the operation of the input unit 2 (step S11-YES). In this case, the control unit 3 displays, on the touch panel display 1, the image data 11 selected in the image data 11-1 to 11-$n$ with a plurality of patterns on the basis of the touch operation on the touch panel display 1 by the user or the operation of the input unit 2 by the user (step S12).

The control unit 3 refers to the database 7 (step S13).

Figure 13A:
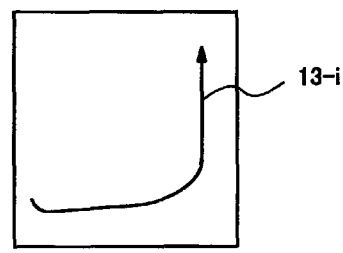
FIG. 13A illustrates an example of trajectory data 13-$i$.
Figure 13B:
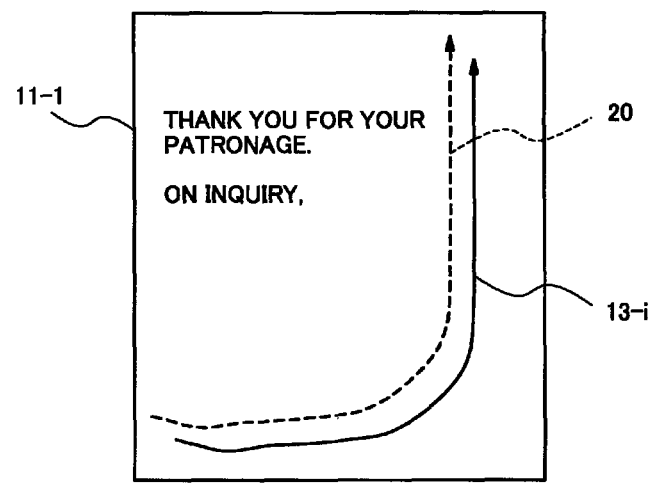
FIG. 13B is an example wherein when the trajectory data 13-$i$ and image data 11-1 are overlay-displayed on a touch panel display 1, a user gesture-inputs an input trajectory on the touch panel display 1 by reference to the trajectory data 13-$i$.
Figure 14A:
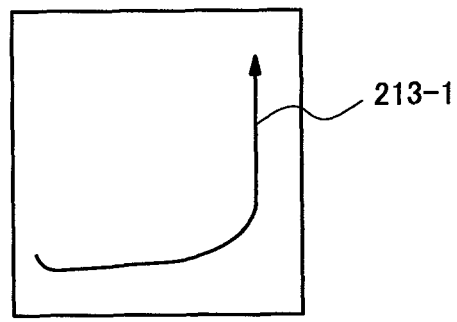
FIG. 14A illustrates an example of the trajectory data.
Figure 14B:
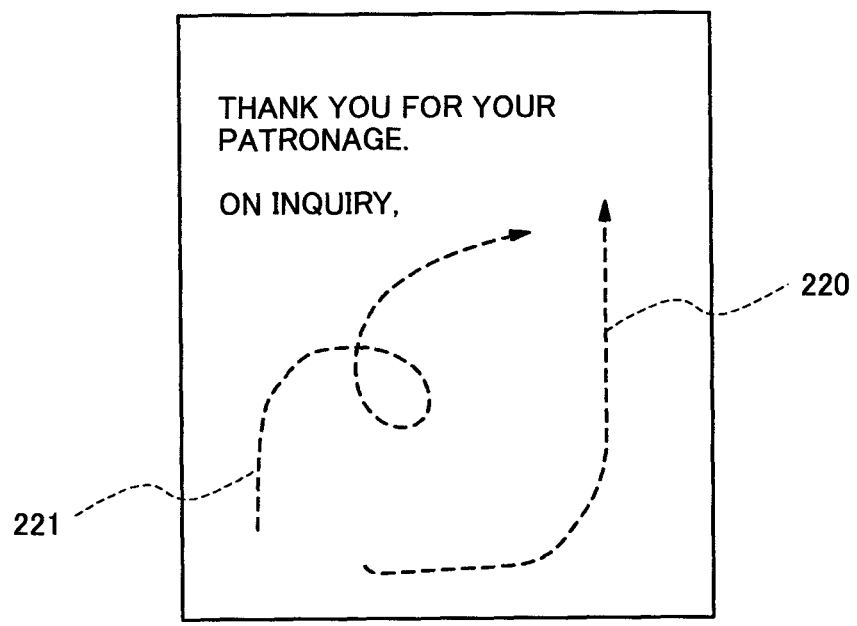
FIG. 14B illustrates an example wherein the input trajectory corresponds with the trajectory data, and an example wherein the input trajectory does not correspond with the trajectory data.

Here, suppose that the propriety information 12 on the image data 11 represents that it is possible to accept the gesture input (step S13-YES). In this case, the control unit 3 overlay-displays the trajectory data 13 registered in the database 7 on the touch panel display 1 so as to be overlaid on the image data 11 (step S14). For example, FIG. 13A illustrates an example of the trajectory data 13-$i$, and FIG. 13B illustrates that the image data 11-1 and the trajectory data 13-$i$ are overlay-displayed. The image data 11-1 includes the character string "Thank you for your patronage. On inquiry,". The function information 14-$i$ is associated with the trajectory data 13-$i$.

When the trajectory data 13 and the image data 11 are overlay-displayed on the touch panel display 1, the control unit 3 monitors whether or not a user carries out the gesture input on the touch panel display 1, until a predetermined period of time elapses (step S15-NO, S19-NO).

As a result of the monitoring, suppose that a user carries out the gesture input on the touch panel display 1 (step S15-YES). In this case, the control unit 3 selects (determine) the trajectory data 13 corresponding to an input trajectory 20 (refer to FIG. 13A), for example, 13-$i$ (refer to FIG. 13B) as the selected trajectory data in the trajectory data 13 included in the trajectory related information 15 (step S16-YES). For example, FIG. 13B illustrates an example that when the trajectory data 13-$i$ and the image data 11-1 are overlay-displayed on the touch panel display 1, a user gesture-inputs the input trajectory 20 on the touch panel display 1 by reference to the trajectory data 13-$i$.

When the selected trajectory data 13 is determined, the control unit 3 stops displaying the trajectory data 13 on the touch panel display 1 (step S17). The control unit 3 activates and executes a function 6 corresponding to the selected trajectory data (step S18). Specifically, the control unit 3 selects the function information 14 associated with the selected trajectory data from the function information 14 included in the trajectory related information 15 registered in the database 7, and activates and executes the function 6 represented by the function information 14.

As a result of monitoring, a user does not carry out the gesture input by the predetermined period of time elapses (step S 19-YES). In this case, the control unit 3 stops displaying the trajectory data 13 on the touch panel display 1 (step S20).

Otherwise, as a result of the monitoring, the trajectory data is not determined when the trajectory data 13 including a trajectory corresponding to the input trajectory 20 does not exist in the trajectory data 13 included in the trajectory related information 15 (step S15-YES), although a user carries out the gesture input on the touch panel display 1 (step S16-NO). When the predetermined period of time elapses while holding an undetermined state (step S19-YES), the control unit 3 stops displaying the trajectory data 13 on the touch panel display 13 (step S20).

Suppose that the propriety information 12 associated with the image data 11 represents that the gesture input is not accepted (step S13-NO). In this case, the control unit 3 displays the image data 11 on the touch panel display 1. The trajectory data 13 is not overlay-displayed on the touch panel display 1.

A first effect and a second effect are achieved by the mobile terminal device of the embodiment.

Initially, the first embodiment is described.

A user is required to draw the same trajectory as the predetermined trajectory data, as the input trajectory 20, in order to carry out the gesture input. Therefore, the user has to remember, for example, the trajectory data 13-1 to 13-*m*, when a plurality of types of sets of the trajectory data exist. The user has to remember the trajectory data 13-1 to 13-*m* corresponding to the functions 6-1 to 6-*m* in order to cause the mobile terminal device to activate and execute a desired function in the functions 6-1 to 6-*m*. In this case, a user may not utilize the gesture input due to a lapse of memory or input of an inaccurate trajectory. In the mobile terminal device of the embodiment, when the image data 11 selected in the image data 11-1 to 11-*n* with a plurality of patterns on the basis of a user's operation is displayed on the touch panel device 1, the trajectory data 13 is overlay-displayed on the touch panel display 1 so as to be overlaid on the image data 11 in order to support the gesture input.

As mentioned above, in the mobile terminal device of the embodiment, as the first effect thereof, it is possible to support the gesture input by overlay-displaying the trajectory data 13 on the touch panel display 1. Thereby, the first problem above described is solved.

Next, the second effect is described.

In the mobile terminal device of the embodiment, the image data 11 is displayed on the touch panel display 1. The image data 11 is selected in the image data 11 with a plurality of patterns on the basis of the user's touch operation on the touch panel display 1 or the user's operation of the input unit. When the selected image data 11 is displayed on the touch panel display 1, the control unit does not necessarily accept the gesture input. For example, depending on software using the image data 11, an electronic device may be in a state of accepting the gesture input or in a state of not accepting the gesture input. In the mobile terminal device of the embodiment, if the gesture input is acceptable, the trajectory data 13 is overlay-displayed on the touch panel display 1 so as to be overlaid on the image data 11.

As described above, in the mobile terminal device of the embodiment, as the second effect thereof, when the trajectory data 13 is overlay-displayed on the touch panel display 1, a user is capable of recognizing that the mobile terminal is in a state of accepting the gesture input. In the other hand, when the trajectory data 13 is not overlay-displayed on the touch panel display 1, a user is capable of recognizing that the mobile terminal is in a state of not accepting the gesture input. Thereby, the second problem above described is solved.

As described above, in the mobile terminal device of the embodiment, it is possible to support the gesture input, and a user is capable of recognizing whether or not the mobile terminal device is in a state of accepting the gesture input.

[Fourth Embodiment]

Next, a fourth embodiment of the invention is described. The electronic device of the fourth embodiment is a mobile terminal device.

The mobile terminal device of the invention includes a touch panel display, a storage unit, and a control unit. Propriety information is registered in the storage unit, which represents whether or not to accept gesture input when a user touches the touch panel display with respect to each of the image data with a plurality of patterns, and registered trajectory data is registered therein, which corresponds to image data accepting the gesture input in the image data with a plurality of patterns. Each of the registered trajectory data includes a registered trajectory supporting the gesture input and a name of a function associated with the registered trajectory. The control unit displays the image data corresponding to a user's operation in the image data with a plurality of patterns on the touch panel display. In this case, when the propriety information for the image data represents acceptance of the gesture input, the control unit overlay-displays the registered trajectory data registered in the storage unit on the touch panel display so as to be overlaid on the image data.

It is obvious that the invention of the present application is not limited to the above mentioned embodiments, and various changes can be made within the scope of the invention described in the claims of the present application and is included in the scope of the invention.

The application claims priority from Japanese Patent Application No. 2009-138828, filed Jun. 10, 2009, the contents of which are incorporation herein by reference their entirety.

INDUSTRIAL APPLICABILITY

The invention can be applied to a electric device having a touch panel display.

Explanation of Reference Numeral

1, 101 touch panel display
2, 101 input unit
3, 103 control unit (CPU)
4, 104 storage unit
5 computer program
6-1 to 6-*m* function
6-*i* function
7 database
11-1 to 11-*n* image data
12 propriety data
13-*i* trajectory data
14-1 to 14-*m* function information
14-*i* function information
15-1 to 15-*m* trajectory related information
20, 220, 221 input trajectory
100 electronic device
111 display data
113, 163 trajectory data
114 function information
115 trajectory related information

The invention claimed is:

1. An electronic device comprising:
a touch panel display;
a storage unit that stores a plurality of sets of display data and trajectory related information that is associated with each of the sets of display data; and
a control unit, wherein
the trajectory related information includes trajectory data and function information that is associated with the trajectory data, and
the control unit determines whether or not to accept gesture input on the basis of the trajectory related information that is associated with the display data to be displayed on the touch panel display, and when determining to accept the gesture input, overlay-displays on the touch panel display without obscuring the display data, the trajectory data included in the trajectory related information that is associated with the display data so as to be overlaid on the display data at a location and in a shape defined by the trajectory data for receiving the gesture input,
wherein when the gesture input is carried out when the trajectory data and the display data are overlay-displayed on the touch panel display, the control unit determines the trajectory data corresponding to an input trajectory inputted through the gesture input, as selected trajectory data, and executes a function that is associated with the selected trajectory data.

2. The electronic device of claim 1, wherein after determining the selected trajectory data, the control unit stops displaying the trajectory data on the touch panel display.

3. The electronic device of claim 1, wherein when the gesture input is carried out when the trajectory data and the display data are overlay-displayed on the touch panel display, and when it is determined that the input trajectory inputted through the gesture input fails to correspond to the trajectory data, the control unit stops displaying the trajectory data on the touch panel display.

4. The electronic device of claim 1, wherein when the gesture input is not carried out in a predetermined period of time after the trajectory data is overlay-displayed on the touch panel display so as to be overlaid on the display data, the control unit stops displaying the trajectory data on the touch panel display.

5. The electronic device of claim 1, wherein when determining not to accept the gesture input, the control unit displays the display data on the touch panel display.

6. The electronic device of claim 1, wherein
the storage unit stores propriety information representing whether or not the display data accepts the gesture input, and
the control unit determines whether or not to accept the gesture input on the basis of the propriety information.

7. The electronic device of claim 1, wherein
the trajectory related information includes a plurality of sets of the trajectory data, and
the control unit overlay-displays the plurality of sets of the trajectory data so as to be overlaid on the display data, on the touch panel display.

8. The electronic device of claim 1, wherein the control unit overlay-displays, on the touch panel display, each of the sets of the trajectory data so as to be overlaid on the display data in different display forms.

9. The electronic device of claim 1, wherein the control unit overlay-displays, on the touch panel display, the function information that is associated with the trajectory data so as to be overlaid on the trajectory data and the display data.

10. The electronic device of claim 1, wherein the display data is selected through a user's touch operation on the touch panel display.

11. The electronic device of claim 1, further comprising;
an input unit, wherein
the display data is selected through a user's touch operation on the touch panel display or a user's operation of the input unit.

12. A gesture processing method, comprising:
determining whether or not to accept gesture input on the basis of trajectory related information that is associated with display data to be displayed on a touch panel display; and
when it is determined to accept the gesture input, overlay-displaying on the touch panel display without obscuring the display data, trajectory data included in the trajectory related information that is associated with the display data so as to be overlaid on the display data at a location and in a shape defined by the trajectory data for receiving the gesture input,
wherein when the gesture input is carried out when the trajectory data and the display data are overlay-displayed on the touch panel display, the trajectory data corresponding to an input trajectory inputted through the gesture input is determined as selected trajectory data, and a function that is associated with the selected trajectory data is executed.

13. The gesture processing method of claim 12, wherein after the selected trajectory data is determined, displaying the trajectory data on the touch panel display ends.

14. The gesture processing method of claim 13, wherein when the gesture input is carried out when the trajectory data and the display data are overlay-displayed on the touch panel display, and when it is determined that an input trajectory inputted through the gesture input fails to correspond to the trajectory data, displaying the trajectory data on the touch panel display ends.

15. The gesture processing method of claim 12, wherein when the gesture input is not carried out in a predetermined period of time after the trajectory data is overlay-displayed on the touch panel display so as to be overlaid on the display data, displaying the trajectory data on the touch panel ends.

16. The gesture processing method of claim 12, when it is determined not to accept the gesture input, the display data is displayed on the touch panel display.

17. The gesture processing method of claim 12, wherein propriety information representing whether or not to accept the gesture input is stored in a storage unit.

18. The gesture processing method of claim 17, wherein it is determined whether or not the gesture input is accepted, on the basis of the propriety information.

19. The gesture processing method of claim 12, the display data is selected on the basis of a user's operation.

20. The gesture processing method of claim 12, wherein when it is determined not to accept the gesture input, the display data is displayed on the touch panel display.

21. A non-transitory computer-readable medium storing a gesture processing program causing a computer to execute:
determining whether or not to accept gesture input on the basis of trajectory related information that is associated with display data to be displayed on a touch panel display, and
overlay-displaying on the touch panel display without obscuring the display data, trajectory data included in the trajectory related information that is associated with the display data so as to be overlaid on the display data at a location and in a shape defined by the trajectory data for receiving the gesture input, when it is determined to accept the gesture input, wherein when the gesture input is carried out when the trajectory data and the display data are overlay-displayed on the touch panel display, the trajectory data corresponding to an input trajectory inputted through the gesture input is determined as selected trajectory data, and a function that is associated with the selected trajectory data is executed.

* * * * *